Aug. 20, 1968 D. O. RUFF 3,398,350
DIRECT CURRENT COMMUTATION SYSTEM FOR
BRUSHLESS ELECTRICAL MOTORS
Filed Oct. 21, 1965 5 Sheets-Sheet 1

INVENTOR.
DONALD O. RUFF

BY
Richard G. Stahr
ATTORNEY

Fig. 3

INVENTOR.
DONALD O. RUFF
BY Richard G. Stahr
ATTORNEY

INVENTOR.
DONALD O. RUFF

United States Patent Office 3,398,350
Patented Aug. 20, 1968

3,398,350
DIRECT CURRENT COMMUTATION SYSTEM
FOR BRUSHLESS ELECTRICAL MOTORS
Donald O. Ruff, Anderson, Ind., assignor to General Motors Corporation, Detroit, Mich., a corporation of Delaware
Filed Oct. 21, 1965, Ser. No. 500,112
5 Claims. (Cl. 321—5)

The present invention relates to a direct current commutation system for brushless type electrical motors and, more specifically, to a system of this type having an improved commutating switch extinguishing circuit.

Recently, there has been increased activity in the development of electrical motor propulsion systems. For this application, the most desirable electrical motor is one which produces a high torque under stall and low speed conditions and which is capable of operation at very high speeds. These two requirements are somewhat contradictory, at least when considering conventional machines. The high stall torque is characteristic of direct current motors while the high speed capability is generally attainable only in alternating current motors with no brushes or commutator. An ideal propulsion motor for high speed applications would be one which has the high speed capabilities of an alternating current motor without the commutator and brush limitations inherent in direct current motors. Therefore, a logical selection would be an alternating current polyphase motor commutated as a direct current motor but without a commutator or brushes. That is, a brushless direct current commutated alternating current motor.

One system of this type employs a polyphase alternating current induction type machine, a solid state commutation system and a triggering system coupled to the output shaft of the motor. The commutation system performs the function normally accomplished by the commutator and brushes of a direct current motor, while the triggering system relates the switching action to shaft position as does the commutator in a conventional direct current motor. Thus, the motor exhibits characteristics identical to those of a direct current motor but, since the machine itself is an alternating current motor, its rotor may be designed to have the structural integrity which permits high speed operation.

As the commutation system eliminates the requirement of a commutator and brushes, it is perhaps the most important element of this system, therefore, the requirement of a reliable, durable and inexpensive commutation system is apparent.

It is, therefore, an object of this invention to provide an improved direct current commutation system for brushless type electrical motors.

It is another object of this invention to provide an improved direct current commutation system for brushless type electrical motors having an improved commutating switch extinguishing circuit.

In accordance with this invention, an improved direct current commutation system for brushless type electrical motors is provided wherein each one of a plurality of silicon controlled rectifier commutating switching devices are extinguished by selectively diverting the current flowing through each towards the opposite power supply line through a corresponding extinguishing switching device.

For a better understanding of the present invention, reference is made to the following description and accompanying drawings in which.

As is well known in the art, the armature of a direct current motor is rotated by the force produced by two interacting fields of magnetic flux which are produced by current flow through the field coils and the armature coils. In conventional machines, the magnetic poles resulting from current flow through the field coils are stationary and the magnetic poles produced by current flow through the armature coils tend to pull into alignment with the field magnetic poles. However, as the armature magnetic poles produced by current flow through any armature coil approaches alignment with the field magnetic poles, the commutator and brushes switch armature current from that coil to the next succeeding coil and the armature magnetic poles thereby produced tend to pull into alignment with the field poles. If this switching action by the commutator and brushes is performed at the proper shaft position, the armature will be rotated by the force produced as the armature poles of successive armature coils tend to pull into alignment with the field poles.

Armature or rotor rotation may also be produced by effectively rotating the magnetic poles produced by current flow through the field coils which tend to pull the poles produced by current flow through the armature coils therealong. This essentially rotating magnetic field may be produced by successively energizing the stator windings of a polyphase alternating current motor at the proper shaft positions from a direct current potential source.

Figure 1:
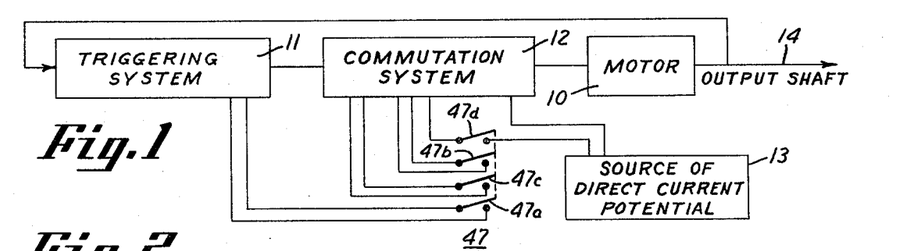
FIGURE 1 is a block diagram of a typical brushless motor system.

Referring to the drawings, throughout the several figures of which like elements have been given like characters of reference, FIGURE 1 sets forth, in block form, a diagram of a typical brushless electrical motor system. The motor 10 may be any polyphase alternating current motor, however, the features of this invention will be described in reference to a three-phase, alternating current motor with Y connected stator coils.

The triggering system relates the switching action of the commutation system to shaft position as does the commutator in a conventional direct current motor.

The commutation system 12 performs the function of the commutator and brushes of a direct current motor. The commutation system, which is the subject of this invention, is schematically set forth in FIGURE 3 and will be explained in detail later in this specification.

As the commutation system energizes the stator coils of motor 10 with direct current power, a source of direct current potential 13 is shown to be connected to the commutation system. This source of direct current power may be a conventional storage battery or batteries.

Triggering system 11 produces electrical signal pulses which operate controllable switching devices, included in commutation system 12, to close and complete an energizing circuit from direct current power source 13 to the corresponding stator coils in motor 10, in a manner to be later explained. As the commutation system performs the function of the commutator and brushes of a direct current motor, the switching action must occur at the proper shaft position to produce rotor rotation. Therefore, the electrical signal pulses produced by triggering system 11 must be related to the position of shaft 14 of motor 10. Velocity type sensing elements are not suitable for this application since shaft position information must be available under stall as well as rotating conditions.

Without intention or inference of a limitation there'o, one method of producing the necessary signal pulses under stall as well as rotating conditions is to position a plurality of radio frequency transformers, each of which corresponds to a shaft position, about the periphery of the motor, energize the primary windings of all of these radio frequency transformers in parallel by a radio frequency oscillator and interrupt the magnetic coupling between the primary and secondary windings of all of the radio frequency transformers except the one corresponding to the shaft position at which an electrical signal is to be produced and at least one other.

To interrupt the magnetic coupling between the primary and secondary windings of all of the radio frequency transformers except the necessary two, a disc of metallic material, such as aluminum, having properly spaced cut-out portions about the periphery may be positioned between the primary and secondary windings of all of the radio frequency transformers are rotated by the motor shaft.

The cut-out portions, when they pass between the primary and secondary windings of any of the radio frequency transformers, permit radio frequency energy to be magnetically coupled therebetween. These bursts of magnetically coupled radio frequency energy are present only during the time a cut-out is passing between primary and secondary windings and are rectified to produce a direct current pulse the width, in radians, of which is proportional to the width of the cut-out. This pulse may be used to operate a conventional square wave generator, such as a Schmitt trigger, which produces the switching signal pulses which are necessary to operate the commutation system. These switching pulses may be amplified in a conventional amplifier and directed to the proper switching devices in commutation system 12.

To simulate a rotating magnetic field in the direct current energized stator of motor 10, it is necessary to provide at least two controllable switches for each phase winding so that direct current may be selectively passed therethrough in either direction. As the novel commutating circuit of this invention will be explained in regard to a three-phase Y connected machine, a total of six controllable commutating switches and, therefore, six switching channels and six radio frequency transformers are required.

Figure 2:
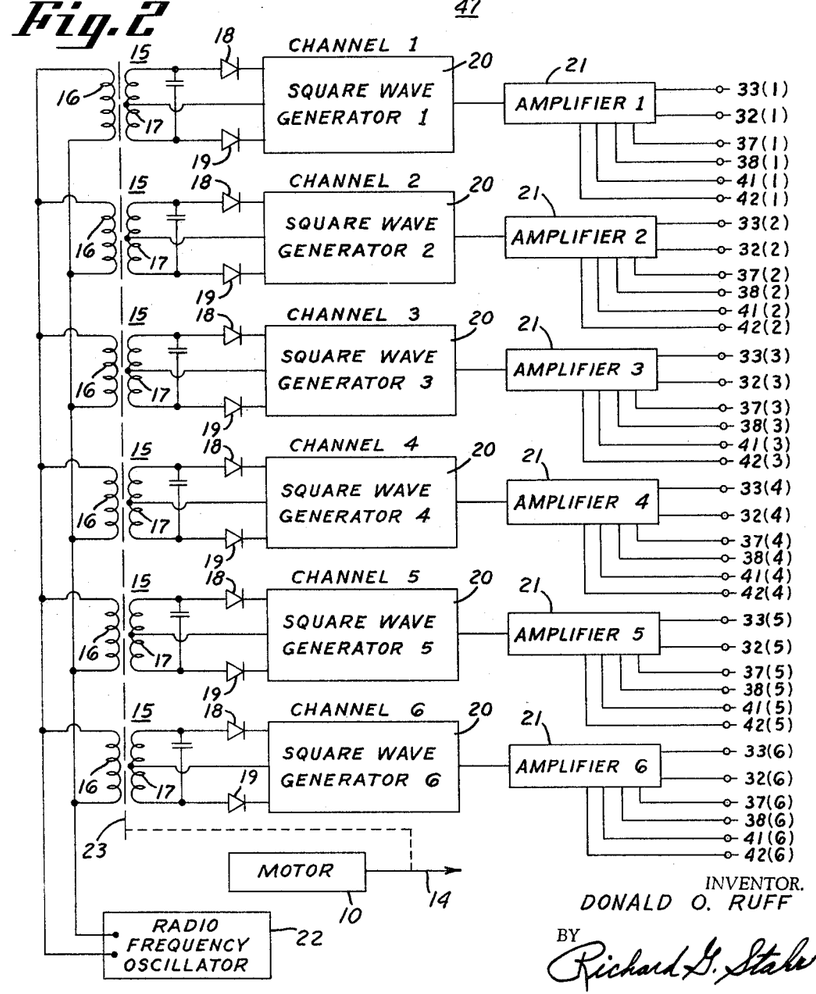
FIGURE 2 sets forth the triggering system of FIGURE 1 partially in schematic and partially in block form.

Triggering system 11 is set forth in FIGURE 2 partially in schematic and partially in block form. Each switching channel includes a radio frequency transformer 15 having a primary winding 16 and a secondary winding 17, a pair of diodes 18 and 19 to full-wave rectify the secondary winding 17 output, a square wave generator 20 and an amplifier 21. As each switching channel includes identical respective components, corresponding components of all channels have been referenced by the same numeral.

The primary winding 16 of all six radio frequency transformers 15 are energized in parallel by a radio frequency oscillator 22 which may be any conventional radio frequency oscillator well known in the art and, therefore, has been shown in FIGURE 2 in block form. In a practical application of this triggering system, oscillator 22 had a natural frequency of 170 kilocycles.

The disc of metallic material located between the primary and secondary windings of all of the radio frequency transformers 15 is schematically represented in FIGURE 2 by dashed line 23 which is shown to be operably connected to output shaft 14 of motor 10.

Figure 4:
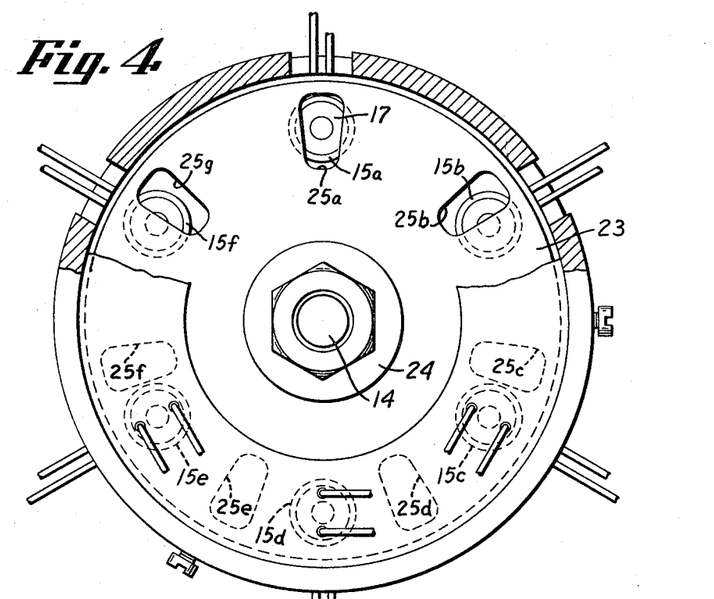
FIGURE 4 is an end view, partially cut away, of a motor shaft position sensing arrangement.
Figure 5:
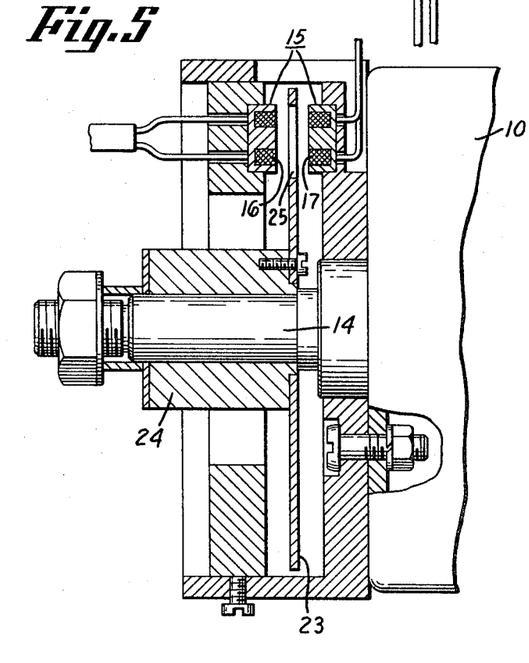
FIGURE 5 is a fragmentary side view, partially in section, of FIGURE 4.

FIGURES 4 and 5 illustrate the mechanical details of one method of mounting radio frequency transformers 15 about the periphery of motor 10 and providing for the interruption of the magnetic coupling between the respective primary and secondary windings thereof. The primary and secondary windings of each transformer may be wound about respective core members of magnetic material having an E cross section which are axially spaced from each other as is shown in FIGURE 5. Disc member 23 is located between the primary and secondary windings of all of the radio frequency transformers 15 and is rotated by the shaft 14 of motor 10. Disc 23 may be secured to hub member 24, which is rotated with shaft 14, by screws or other suitable fastening means.

The number of cut-out portions required in disc 23 is equal to the number of pole pairs in the motor with which this system is to be used. Assuming motor 10 to have seven pole pairs, seven cut-out portions, referenced 25a through 25g in FIGURE 4, are located about the periphery of disc 23 and are spaced in such a manner that at least a partial magnetic coupling is established between the primary and secondary windings of at least two of the radio frequency transformers 15 at all times.

In FIGURE 4, cut-out portion 25a is axially aligned with the primary and secondary windings of radio frequency transformer 15a and cut-out portions 25b and 25g are in partial axial alignment with the primary and secondary windings of radio frequency transformers 15b and 15f, respectively. Assuming that shaft 14 is revolving in a clockwise direction, as looking at FIGURE 4, full magnetic coupling between the primary and secondary windings of radio frequency transformer 15b will be established after a few degrees of rotation when cut-out portion 25b is in axial alignment therewith.

Should the shaft 14 of motor 10 be revolving in a counterclockwise direction, full magnetic coupling between the primary and secondary windings of radio frequency transformer 15f will be established after a few degrees of rotation as cut-out portion 25g comes into axial alignment therewith. With shaft 14 rotating in either direction, therefore, full magnetic coupling between the primary and secondary windings of successive radio frequency transformers 15 is established. With this arrangement, there is always a switching signal source under stall conditions which is followed by successive discrete switching signals as the shaft 14 of motor 10 rotates.

Figure 7:
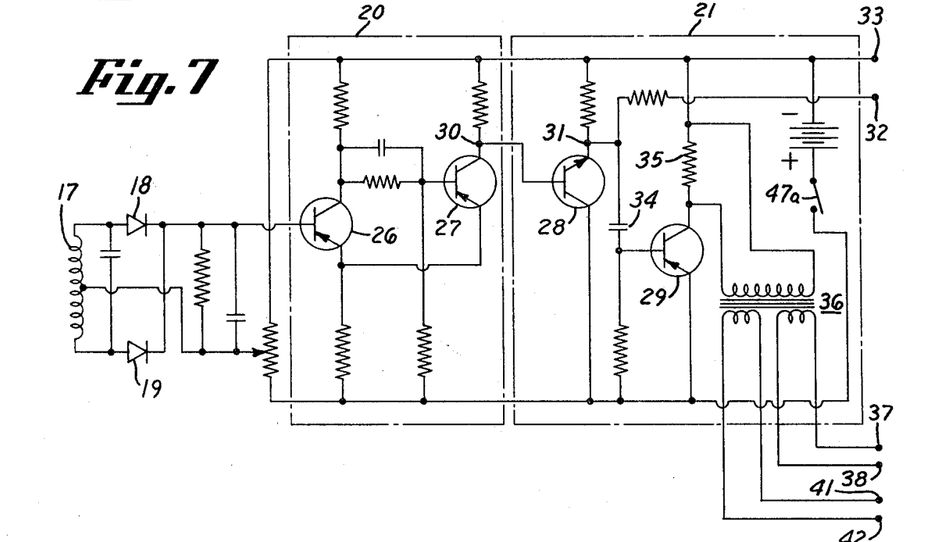

FIGURE 7 sets forth, in schematic form, circuit details of a square wave generator 20, an amplifier 21, and the external circuitry which may be employed for coupling square wave generator 20 to the secondary winding 17 of each of the radio frequency transformers 15. This circuitry is suitable for use as the square wave generator and amplifier in each of the switching channels schematically shown in block form in FIGURE 2 and referenced by the numerals 20 and 21, respectively.

Referring to FIGURE 7, transistors 26 and 27 and their associated interconnecting circuitry comprise a conventional Schmitt trigger circuit. Circuits of this type are well known and are characterized by the ability to operate in one stable state with no potential applied to the input electrodes of the first transistor 26 and will revert to an alternate stable state when a sufficient potential is applied to the input electrodes of transistor 26.

Transistors 28 and 29 and their associated interconnecting circuitry comprise a three output amplifier circuit which provides an initial positive going output pulse which is followed by two positive going output pulses when the initial output pulse returns to zero.

With no signal present upon secondary winding 17 and, consequently, no potential applied across the input terminals of transistor 26, transistor 26 is conducting and transistors 27, 28 and 29 are not conducting. Should one of the cut-out portions 25 about the periphery of disc 23 establish the magnetic coupling between secondary winding 17 and its associated primary winding 16, a high frequency alternating current potential is induced in secondary winding 17 which is full wave rectified by diodes 18 and 19 and applied as a positive polarity potential across the base-emitter electrodes of type PNP transistor 26. As the presence of a potential upon the base electrode of a type PNP transistor which is of a polarity more positive than that applied to the emitter electrode will not permit emitter-base current flow through a type PNP transistor, transistor 26 is extinguished and transistor 27 is triggered to conduction through the well known Schmitt trigger circuit action. With transistor 27 conducting, the potential at junction 30, which is applied to the base electrode of type NPN transistor 28, goes positive with respect to terminal 33. As this condition satisfies the base-emitter bias requirements for base-emitter current flow through a type NPN transistor, transistor 28 conducts. As transistor 28 conducts, the potential at junction 31 goes positive and a commutating switching signal pulse appears across output terminals 32 and 33 which is of a positive polarity on terminal 32. As transistor 28 conducts, capacitor 34 discharges through the collector-emitter circuit thereof and holds transistor 29 extinguished.

As the cut-out 25 about the periphery of disc 23 moves out of axial alignment with secondary winding 17 and its associated primary winding, the magnetic coupling therebetween is interrupted by the solid portion of disc 23 and the positive polarity potential is removed from the base electrode of transistor 26. Upon the removal of this potential from the base of transistor 26, this device again conducts and transistor 27 extinguishes through the well known Schmitt trigger circuitry action. As transistor 27 extinguishes, substantially equal potential is applied across the base-emitter electrodes of type NPN transistor 28 which extinguishes this transistor device and removes the positive polarity pulse from output terminals 32 and 33. With transistor 28 extinguished, battery potential appears across capacitor 34 and the emitter-base junction of transistor 29. Capacitor 34 charges through the emitter-base junction of transistor 29 thereby supplying base current through type PNP transistor 29. Therefore, this device conducts until capacitor 34 becomes charged.

As transistor 29 conducts, a current flows through resistor 35 and the primary winding of transformer 36 which induces a potential pulse in each of the secondary windings of transformer 36. These induced pulses appear as an extinguishing switching signal pulse across output terminals 37 and 38 and a charging switching signal pulse across output terminals 41 and 42. For purposes of this specification, it will be assumed that transformer 36 is so poled that these signal pulses are of a positive polarity at output terminals 37 and 41.

When capacitor 34 has become charged, the potential upon the base of transistor 29 is of a positive polarity, a condition which does not satisfy the base-emitter bias requirement for emitter-base current flow through a type PNP transistor, therefore, this device is extinguished and the signal pulses are removed from output terminals 37 and 38 and 41 and 42. At this time, this circuitry has returned to its initial normal state and is prepared to produce a commutating switching signal pulse followed by an extinguishing switching signal pulse and a charging switching signal pulse the next time magnetic coupling is established between a secondary winding 17 and its associated primary winding. The width of the positive polarity commutating switching signal pulse which appears across output terminals 32 and 33 is determined by the period of time that magnetic coupling is established between a secondary winding 17 and its associated primary winding.

Figure 3:
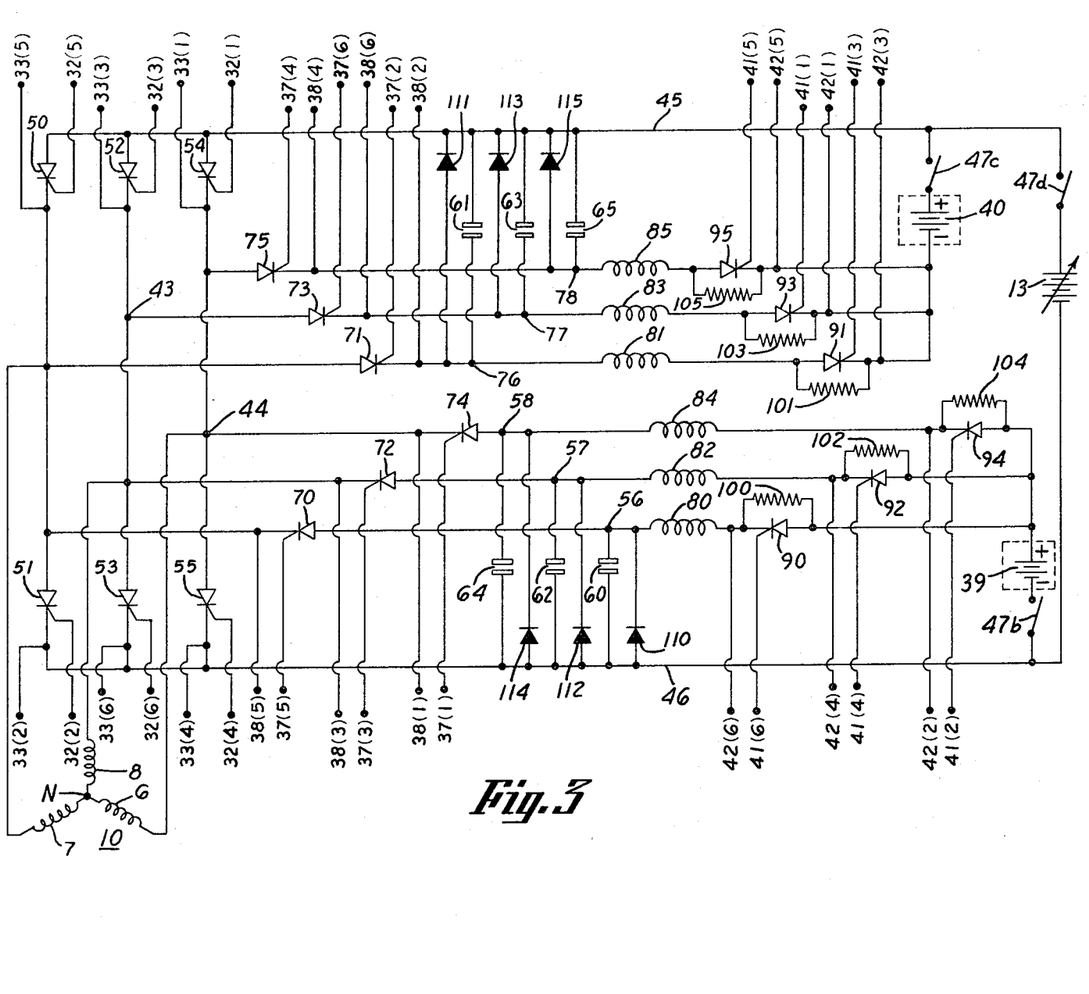
FIGURE 3 is a schematic diagram of the novel commutation system of this invention.

The trigger system forms no part of this invention, however, the foregoing description has been included in this specification for the purpose of indicating one acceptable method for providing, at the proper times, the switching signals which are required for the operation of the novel commutation system schematically set forth in FIGURE 3, which is the subject of this invention. For this reason, the description of the trigger system has deliberately been made brief.

Referring to FIGURE 3, the novel commutation system of this invention is set forth in schematic form. Direct current power may be supplied by a conventional storage type battery 13 which may be connected across the positive polarity input supply line 45 and the negative polarity input supply line 46, as indicated. The novel commutation system of this invention does not require the direct current power source to be a battery, as it will function satisfactorily with rectified alternating current power.

The stator coils 6, 7 and 8 of motor 10 are schematically set forth in FIGURE 3. Although stator coils 6, 7 and 8 have been indicated in FIGURE 3 to be connected in a Y configuration, it is to be specifically understood that the novel commutation system of this invention is equally applicable to stator coils connected in a delta configuration. The coils 6, 7 and 8 of FIGURE 3 are not to be construed as single coils but as a schematic representation of all coils included in the respective phases. Throughout the specification, the ends of coils 6, 7 and 8 which are not connected to the electrical neutral point N will be referred to as the terminal ends.

To properly energize coils 6, 7 and 8, a bridge type commutating switching circuit, having a positive and a negative polarity bank of silicon controlled rectifier commutating switching devices is provided and is connected across input circuit supply lines 45 and 46. In FIGURE 3, this bridge type commutating switching circuit comprises silicon controlled rectifiers 50, 51, 52, 53, 54 and 55.

The silicon controlled rectifier is a semiconductor device having a control electrode, generally termed the gate electrode, and two current carrying electrodes, generally referred to as the anode and cathode electrodes, which is designed to normally block current flow in either direction. With the anode and cathode electrodes forward poled, anode positive and cathode negative, the silicon controlled rectifier may be triggered to conduction upon the application, to the control electrode, of a control potential signal of a polarity which is positive in respect to the potential present upon the cathode electrode and of sufficient magnitude to produce control electrode-cathode, or gate, current. In the conducting state, the silicon controlled rectifier will conduct current in one direction and retains the ability to block current flow in the opposite direction. In the conducting state, therefore, the silicon controlled rectifier functions as a conventional diode. Upon being triggered to conduction, however, the control electrode is no longer capable of affecting the device, which will remain in the conducting state until either the anode-cathode circuit is interrupted or the polarity of the potential applied across the anode-cathode electrodes is reversed. Of these two alternatives, the reversal of the polarity of the potential across the anode-cathode electrodes thereof is perhaps the most satisfactory.

As this specification will describe the operation of the novel commutating circuit of this invention as used with a three phase alternating current machine, and since current must be passed in both directions through the phase windings to produce the required effectively rotating magnetic field, it is necessary to provide two commutating switching devices for each phase winding. With a three phase machine, therefore, a total of six commutating switching devices is required. With alternating current machines of more or less phases, correspondingly more or less commutating switching devices may be required.

The bridge type commutating switching circuit includes a positive and a negative polarity bank of silicon controlled rectifier commutating switches. Included in the positive polarity bank of the commutating switching circuit are the three silicon controlled rectifier commutating switches having the anode electrodes connected to positive polarity input supply line 45 and included in the negative polarity bank of this switching circuit are the three silicon controlled rectifier commutating switches having the cathode electrodes connected to the negative polarity input supply line 46. That is, silicon controlled rectifier commutating switches 50, 52 and 54 comprise the positive polarity bank of commutating switches and silicon controlled rectifier commutating switches 51, 53 and 55 comprise the negative polarity bank of commutating switches.

Corresponding to each one of the silicon controlled rectifier commutating switches of the bridge type commutating switching circuit is an electrical charge storage device in which an electrical charge may be stored. These electrical charge storage devices have been shown in FIGURE 3 as capacitors 60, 61, 62, 63, 64 and 65 which correspond to respective silicon controlled rectifier commutating switches 50, 51, 52, 53, 54 and 55 of the commutating switching circuit.

To charge the capacitors corresponding to those silicon controlled rectifier commutating switches included in the positive polarity bank of commutating switches in the commutating switching circuit is a first auxiliary charging direct current potential source, shown in FIGURE 3 as a battery 39. To charge the capacitors corresponding to those silicon controlled rectifier commutating switches included in the negative polarity bank of commutating switches of the commutating switching circuit is another auxiliary charging direct current potential source, shown in FIGURE 3 as a battery 40.

So that each electrical charge storage device may be selectively charged, there is provided a controllable charging switching device of the type having at least two current carrying electrodes and a control electrode which, when forward poled, may be triggered to conduction upon the application of a proper polarity signal pulse to the control electrode thereof, corresponding to each electrical charge storage device.

These controllable charging switching devices are indicated in FIGURE 3 as silicon controlled rectifier charging switches 90, 91, 92, 93, 94 and 95 which correspond to respective capacitors 60, 61, 62, 63, 64 and 65.

Capacitors 60, 62 and 64, corresponding to respective silicon controlled rectifier commutating switches 50, 52 and 54 included in the positive polarity bank of commutating switches in the commutating switching circuit, are connected in parallel across battery 39 through respective series silicon controlled rectifier charging switches 90, 92 and 94 and series charging inductors 80, 82 and 84. Capacitors 61, 63 and 65, corresponding to respective silicon controlled rectifier commutating switches 51, 53 and 55 included in the negative polarity bank of commutating switches in the commutating switching circuit, are connected in parallel across battery 40, through respective series silicon controlled rectifier charging switches 91, 93 and 95 and series charging inductors 81, 83 and 85.

To substantially double the charge upon each electrical charge storage device compared to the source supplying it, an inductor element is included in the charging circuitry to provide a resonant circuit.

The electrical charge on capacitors 60, 61, 62, 63, 64 and 65 must be of a sufficient magnitude to extinguish the corresponding silicon controlled rectifier commutating switches, this magnitude being determined by the current flowing through these switches, and, in any event, this charge must be of a magnitude greater than the potential of main battery 13 at all times. Therefore, batteries 39 and 40, or another source of direct current potential which may be substituted thereof, must be selected to have a potential of a magnitude which will satisfy the two requirements. With the series inductors included in the charging circuit of each capacitor, the magnitude of the charge upon these devices may be as much as 1.8 times supply potential.

So that each silicon controlled rectifier commutating switch may be selectively extinguished, provision is made for selectively diverting the current flowing through the anode-cathode electrodes of each silicon controlled rectifier commutating switch of the commutating switching circuit toward the opposite power supply line. To establish a diverting circuit, there is provided a controllable extinguishing switching device, of the type having at least two current carrying electrodes and a control electrode and being of the type which, when forward poled, may be triggered to conduction upon the application of a proper polarity signal pulse to the control electrode thereof, corresponding to each silicon controlled rectifier commutating switch.

These controllable extinguishing switching devices are indicated in FIGURE 3 as silicon controlled rectifier extinguishing switches 70, 71, 72, 73, 74 and 75 which correspond to respective silicon controlled rectifier commutating switches 50, 51, 52, 53, 54 and 55.

Each commutating switching device, the corresponding electrical charge storage device and the corresponding extinguishing switching device are interconnected in such a manner that the current flowing through each silicon controlled recifier commutating switch is diverted toward the opposite supply line when the corresponding extinguishing switching device is triggered to conduction. Specifically, the series combination of a capacitor and the anode and cathode electrodes of a silicon controlled rectifier extinguishing switch is connected between the anode electrode of each silicon controlled rectifier in the negative polarity bank and the positive polarity power supply line and between the cathode electrode of each silicon controlled rectifier in the positive polarity bank and the negative polarity power supply line. In FIGURE 3, for example, the series combination of capacitor 65 and the anode-cathode electrodes of silicon controlled rectifier extinguishing switch 75 is connected between the anode electrode of silicon controlled rectifier commutating switch 55 and positive polarity supply line 45.

The commutating switches, the extinguishing switches and the charging switches have been indicated in FIGURE 3 to be silicon controlled rectifiers. It is to be specifically understood, that alternate switching devices having similar electrical characteristics and ratings may be substituted therefor without departing from the spirit of the invention.

The control electrode of each of the silicon controlled rectifier commutating switches is connected to the positive polarity output terminal 32 and the cathode electrode of each of the silicon controlled rectifier commutating switches is connected to the negative polarity output terminal 33 of the corresponding amplifier 21 schematically set forth in FIGURE 2 and detailed in FIGURE 7. That is, the control-cathode electrodes of silicon controlled rectifier commutating switches 50, 51, 52, 53, 54 and 55 are connected across the output terminals corresponding to output terminals 32 and 33, respectively, of FIGURE 7, of respective amplifiers 5, 2, 3, 6, 1 and 4 of FIGURE 2. In FIGURES 2 and 3, these connections are so labelled.

With transistor 28 of FIGURE 7 in its normal state of nonconduction, there is substantially no potential across output terminals 32 and 33. With transistor 28 conducting, a potential pulse, which is of a positive polarity at output terminal 32, appears across output terminals 32 and 33 and is, therefore, applied across the control-cathode electrode of the corresponding silicon controlled rectifier commutating switch. As this is the proper control-cathode electrode potential relationship to produce control-cathode electrode gate current flow through a silicon controlled rectifier, gating current flows through the corresponding silicon controlled rectifier device through a circuit which may be traced from the positive polarity terminal of the potential source of FIGURE 7 through conducting transistor 28, positive polarity output terminal 32, the control-cathode electrode of the corresponding silicon controlled rectifier and input terminal 33 to the negative polarity terminal of the potential source of FIGURE 7. This gate current will trigger the corresponding silicon controlled rectifier switch to conduction when it is forward poled.

The control electrode of each of the silicon controlled rectifier extinguishing switching devices is connected to the positive polarity output terminal 37 and the cathode electrode of each of the silicon controlled rectifier extinguishing switching devices is connected to the negative polarity output terminal 38 of the corresponding amplifier 21 schematically set forth in FIGURE 7. That is, the control-cathode electrodes of silicon controlled rectifier extinguishing switches 70, 71, 72, 73, 74 and 75 are connected across the terminals corresponding to output terminals 37 and 38, respectively, of FIGURE 7 of respective amplifiers 5, 2, 3, 6, 1 and 4 of FIGURE 2. In FIGURES 2 and 3, these connections are so labeled.

The control electrode of each of the silicon controlled rectifier charging switching devices is connected to the positive polarity output terminal 41 and the cathode electrode of each of the silicon controlled rectifier charge reversing switching devices is connected to the negative polarity output terminal 42 of the corresponding amplifier 21 schematically set forth in FIGURE 7. That is, the control-cathode electrodes of silicon controlled rectifier charging switches 90, 91, 92, 93, 94 and 95 are connected across the terminals corresponding to output terminals 41 and 42, respectively, of FIGURE 7 of respective amplifiers 6, 3, 4, 1, 2 and 5 of FIGURE 2. In FIGURES 2 and 3, these connections are so labeled.

As transistor device 29 of FIGURE 7 is triggered to conduction as transistor 28 goes non-conducting, in a manner previously described, a pulse is induced from the primary to the secondary windings of transformer 36. The secondary windings of transformer 36 are so poled that with transistor 29 conducting the potential at output terminals 37 and 41 is of a positive polarity in respect to that at output terminals 38 and 42.

As the control electrode of the corresponding silicon controlled rectifier extinguishing switch and the control electrode of the corresponding silicon controlled rectifier charging switch are connected to respective output terminals 37 and 41 and the cathode electrode of the same silicon controlled rectifier extinguishing switch and the cathode electrode of the same silicon controlled rectifier charging switch are connected to respective output terminals 38 and 42, these signal pulses produce gate current through the respective corresponding silicon controlled rectifier extinguishing switch and the corresponding silicon controlled rectifier charging switch and will trigger these devices to conduction when they are forward poled.

Figure 6:
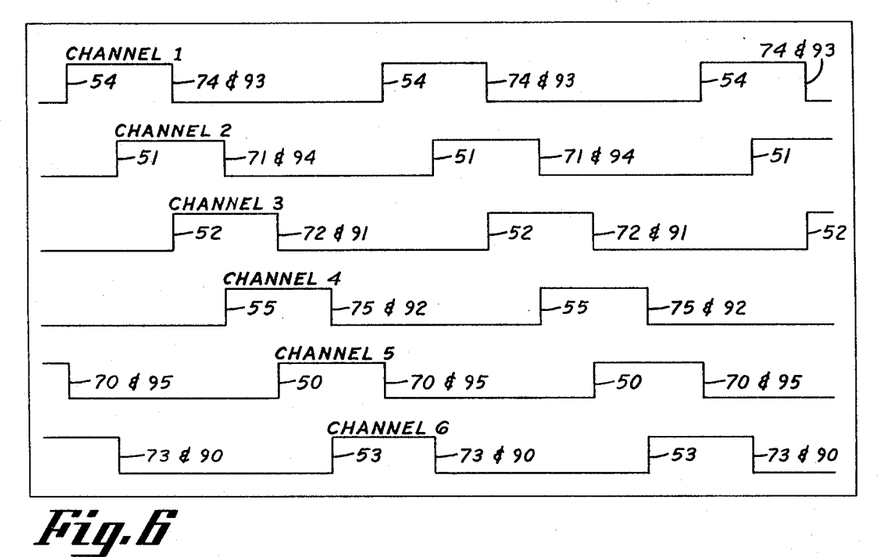
FIGURE 6 is a set of curves helpful in understanding the features of this invention, FIGURE 7 sets forth, in schematic form, circuit details of a square wave generator, pulse amplifier and input coupling circuitry, which may be used with the trigger system of FIGURE 2, and FIGURES 8a, 8b and 8c are a set of curves useful in understanding the operation of the circuit of this invention.

FIGURE 6 represents the sequence and time relationship of the commutating switch signal potentials which appear across the output terminals corresponding to output terminals 32 and 33 of FIGURE 7 of each of the respective amplifiers 21 of FIGURE 2 as the shaft 14 of motor 10 rotates and the magnetic coupling between the primary and secondary windings of successive radio frequency transformers is established by the cut-out portion of disc 23. As has previously been described, the corresponding silicon controlled rectifier commutating switch is triggered to conduction upon the rise of each commutating switch signal appearing across the output terminals corresponding to terminals 32 and 33 and the corresponding silicon controlled rectifier extinguishing switch and the corresponding charging switch are triggered to conduction by the extinguishing switch signal which appears across the output terminals corresponding to terminals 37 and 38 and 41 and 42, respectively, of FIGURE 7 of each of the respective amplifiers 21 upon the fall of each commutating switch signal. Therefore, the rise of each commutating switch signal of each channel is labeled by the numeral which references the corresponding silicon controlled rectifier commutating switch and the fall of each commutating switch signal of each channel is labeled by the numeral which references the corresponding silicon controlled rectifier extinguishing switch and the corresponding charging switch.

As the action of the commutating switch signals, the extinguishing switch signals and the charging switch signals to trigger the corresponding silicon controlled rectifier switching devices to conduction has been hereinbefore described in detail, in the following description of the operation of the novel commutating circuit of this invention, it will only be stated that the presence of these signals in any channel triggers the corresponding silicon controlled rectifier switching device to conduction.

Assuming that the system is unenergized and that the position of disc 23 relative to the six radio frequency transformers is as shown in FIGURE 4, cut-out portion 25a is in axial alignment with the primary and secondary windings of radio frequency transformer 15a and cut-out portions 25b and 25g are in partial axial alignment with the primary and secondary windings of radio frequency transformers 15b and 15f, respectively.

Upon the closure of switch 47, which may be any conventional four pole, single throw, maintained contact switch, positive polarity input supply line 45 and negative polarity input supply line 46 are energized by main battery 13 through closed contact 47d of switch 47, a charging circuit is established for capacitors 60, 62 and 64 from battery 39 through closed contact 47b of switch 47, a charging circuit is established for capacitors 61, 63 and 65 from battery 40 through closed contact 47c of switch 47 and power is supplied to the pulse amplifier circuitry of FIGURE 7 through closed contact 47a of switch 47.

Although silicon controlled rectifiers are characterized by the ability to block current flow in either direction when in the non-conducting state, it has been found that these devices are not ideal, but that a small leakage current is conducted therethrough while in the non-conducting or blocking state with the anode-cathode electrodes forward poled. As the anode-cathode electrodes of all of the silicon controlled rectifier commutating switches of the commutating switching circuit are connected to respective positive and negative potential input supply lines 45 and 46 and since these devices are not ideal, each appears electrically as a high value resistance which conducts a small current. Therefore, a portion of the direct current potential appearing across input supply lines 45 and 46 is dropped across each commutating silicon controlled rectifier, a condition which forward poles each one of these devices.

Capacitors 60, 62 and 64 are charged by battery 39 through respective charging resistors 100, 102 and 104 and the closed movable contact 47b of switch 47. The charge on these capacitors if of a positive polarity at respective junctions 56, 57 and 58. As these junctions are connected to the anode electrodes of respective silicon controlled rectifier extinguishing switches 70, 72 and 74, these devices are forward poled by the electrical charge upon capacitors 60, 62 and 64.

Capacitors 61, 63 and 65 are charged by battery 40 through respective charging resistors 101, 103 and 105 and the closed movable contact 47c of switch 47. The charge on these capacitors is of a negative polarity at respective junctions 76, 77 and 78. As these junctions are connected to the cathode electrodes of respective silicon controlled rectifier extinguishing switches 71, 73 and 74, these devices are forward poled by the charge upon respective capacitors 61, 63 and 65.

Charging resistors 100, 101, 102, 103, 104 and 105 are connected in shunt with respective charging switches 90, 91, 92, 93, 94 and 95 to provide a charging circuit for respective capacitors 60, 61, 62, 63, 64 and 65 upon the closure of switch 47 as the charging switches are not conducting at this time.

The burst of radio frequency energy magnetically coupled between the primary and secondary windings of radio frequency transformer 15a of FIGURE 4 is rectified and applied to square wave generator 1 which produces a commutating switch signal across output terminals 32 and 33 of amplifier 1 of channel 1 which triggers silicon controlled rectifier commutating switch 54 to conduction.

As the magnetic coupling between the primary and secondary windings of radio frequency transformers 15b and 15f is partially established by respective cut-out portions 25b and 25g, a commutating switch signal also appears across the output terminals 32 and 33 of the amplifier 21 corresponding to channels 2 and 6, respectively, which triggers silicon controlled rectifier commutating switches 51 and 53, respectively, to conduction.

Conducting silicon controlled rectifier commutating switches 54, 51 and 53 energize motor coil 6 and motor coils 7 and 8 in parallel. Therefore, motor 10 begins to rotate and continues to rotate as long as the system remains energized.

After a few degrees of rotation, the magnetic coupling between the primary and secondary windings of radio frequency transformer 15f is interrupted and the commutating switch signal appearing across output terminals 32 and 33 of the amplifier 21 corresponding to channel 6 falls, producing an extinguishing switch signal across output terminals 37 and 38 and a charging switch signal across output terminals 41 and 42 of the same amplifier, in a manner previously described.

The extinguishing switch signal is applied across the control-cathode electrodes of silicon controlled rectifier extinguishing switch 73 and triggers this device to conduction. With silicon controlled rectifier extinguishing switch 73 conducting, the current flowing through conducting silicon controlled rectifier commutating switch 54 is diverted away from silicon controlled rectifier commutating switch 53 toward positive polarity input supply line 45 through the negative plate of capacitor 63 which is more negative than negative polarity input supply line 46, quickly extinguishing commutating switch 53. The energizing circuit for stator coil 8 is interrupted by extinguished silicon controlled rectifier commutating switch 53, therefore, only coils 6 and 7 of motor 10 are energized.

As silicon controlled rectifier commutating switch 53 is extinguished and interrupts the energizing circuit of stator coil 8, the resulting collapsing magnetic field induces a potential across the terminal ends of coils 8 and 7 which is of a positive polarity at the terminal end of coil 8. This induced potential produces a charging current through conducting silicon controlled rectifier extinguishing switch 73 which begins to place a charge upon capacitor 63 which is of a positive polarity at junction 77. The positive polarity potential present at junction 77 reverse poles the anode-cathode electrodes of silicon controlled rectifier extinguishing switch 73, a condition which quickly extinguishes this device.

Figure 8A:
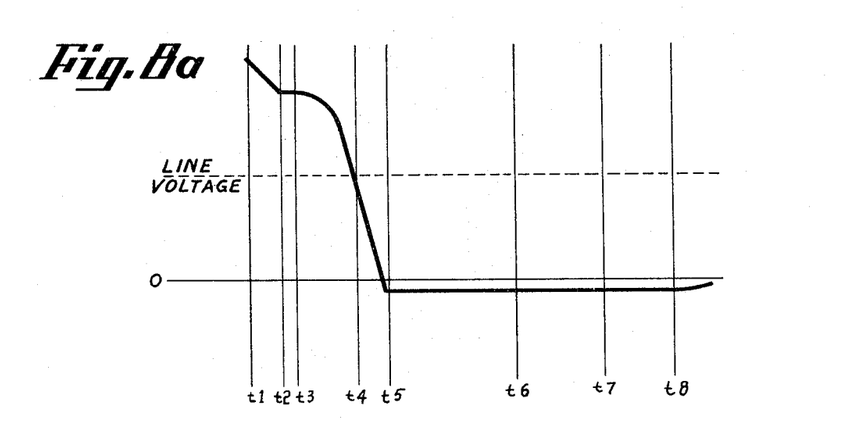
Figure 8B:
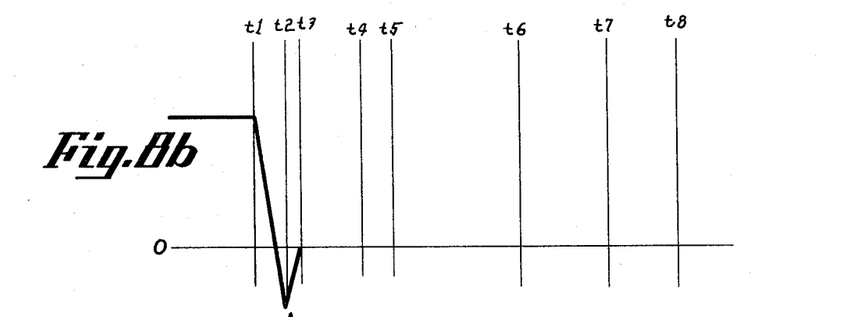
Figure 8C:
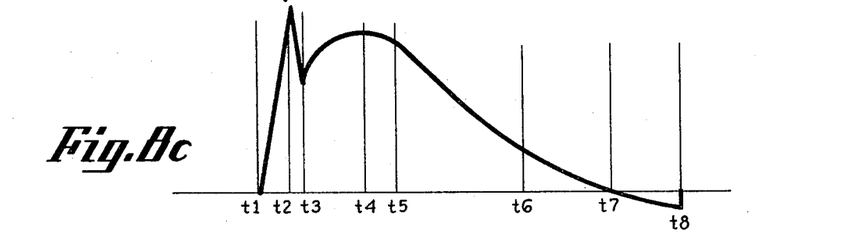

The operation of this unique extinguishing circuitry may be more clearly understood by referring to FIGURES 8a, 8b and 8c which graphically show the potential across capacitor 63, the current flow through silicon controlled rectifier commutating switch 53 and the current flow through silicon controlled rectifier extinguishing switch 73, respectively.

As silicon controlled rectifier extinguishing switch 73 begins conducting, current flow therethrough rapidly increases into the negative polarity plate of capacitor 63, as shown between times $t_1$ and $t_2$ of FIGURE 8c. As the flow through conducting silicon controlled rectifier extinguishing switch 73 increases, there is a corresponding rapid decrease of current flow through silicon controlled rectifier commutating switch 53, as shown in FIGURE 8b, and the potential across capacitor 63 begins to reduce, as shown in FIGURE 8a.

The current flow through conducting silicon controlled rectifier 73 results in a potential at junction 43 which becomes increasingly more negative. As the negative polarity plate of capacitor 63 is more negative than the negative polarity supply line 46, current tends to flow in a reverse direction through silicon controlled rectifier commutating switch 53 from negative polarity supply line 46 toward junction 43 and reaches a maximum magnitude at time $t_2$, as is shown in FIGURE 8b. This reverse current through conducting silicon controlled rectifier commutating switch 53 quickly extinguishes this device.

As current flow through forward conducting silicon controlled rectifier 54 and the reverse current through silicon controlled rectifier commutating switch 53 are additive and flow through conducting silicon controlled rectifier extinguishing switch 73, current flow through this device reaches a maximum at time $t_2$, as is shown in FIGURE 8c, and decreases with the decrease of reverse current flow through silicon controlled rectifier commutating switch 53, as shown in FIGURE 8c between $t_2$ and $t_3$.

The charging current produced by the induced potential across coils 8 and 7 increases the current flow through conducting silicon controlled rectifier extinguishing switch 73 between times $t_3$ and $t_4$ and tends to reverse the charge upon capacitor 63, as shown in FIGURE 8a between times $t_2$ and $t_5$. However, diode 113, which is forward poled at time $t_5$, begins to conduct and limits the charge upon capacitor 63 to a value substantially equal to the drop across conducting diode 113.

As the induced potential deteriorates, the current through silicon controlled rectifier commutating switch 73 reduces in magnitude and reaches zero at time $t_7$, as shown in FIGURE 8c. The slight charge upon capacitor 63, which is of a positive polarity at junction 77, produces a reverse current flow through conducting silicon controlled rectifier commutating switch 73, which reaches a maximum magnitude at time $t_8$ of FIGURE 8c, quickly extinguishing this device.

After a few more degrees of rotation, the magnetic coupling between the primary and secondary windings of radio frequency transformer 15c is established through cut-out portion 25c and the magnetic coupling between the primary and secondary windings of radio frequency transformer 15a is interrupted.

The burst of radio frequency energy magnetically coupled between the primary and secondary windings of radio frequency transformer 15c of FIGURE 4 is rectified and applied to square wave generator 3 which produces a commutating switch signal across output terminals 32 and 33 of amplifier 3 of channel 3. This commutating switch signal triggers silicon controlled rectifier commutating switch 52 to conduction.

The commutating switch signal appearing across output terminals 32 and 33 of the amplifier 1 of channel 1 falls and produces an extinguishing switch signal across output terminals 37 and 38 and a charging switch signal across output terminals 41 and 42 of the same amplifier, in a manner previously described.

The extinguishing switch signal is applied across the control-cathode electrodes of silicon controlled rectifier extinguishing switch 74 and triggers this device to conduction. With silicon controlled rectifier extinguishing switch 74 conducting, the current flowing through coils 6 and 7 of motor 10 and conducting silicon controlled rectifier commutating switch 51 is now supplied by the charge upon capacitor 64 which is of a magnitude more positive than positive polarity input supply line 45. The current supplied by discharging capacitor 64 diverts the current flowing through motor coils 6 and 7 and conducting silicon controller rectifier commutating switch 51 away from silicon controlled rectifier commutating switch 54 toward negative polarity supply line 46, quickly extinguishing silicon controlled rectifier commutating switch 54.

As has previously been explained in regard to silicon controlled rectifier commutating switch 53, the increase of current flow through conducting silicon controlled rectifier extinguishing switch 74 produces a corresponding rapid decrease of current flow through silicon controlled rectifier commutating switch 54 and the potential at junction 44 increases in a positive direction. As the positive polarity plate of capacitor 64 is more positive than positive polarity supply line 45, current tends to flow in a reverse direction through silicon controlled rectifier commutating switch 54, quickly extinguishing this device.

As silicon controlled rectifier commutating switch 54 is extinguished and interrupts the energizing circuit for stator coil 6, the resulting collapsing magnetic field induces a potential across the terminal ends of coils 6 and 7. This induced potential is of a negative polarity at the terminal end of coil 6 and places a charge upon capacitor 64, through conducting silicon controlled rectifier extinguishing switch 74, which is of a negative polarity at junction 58 and is limited in magnitude by diode 114. This charge upon capacitor 64 is of a reverse polarity relationship relative to the anode-cathode electrodes of silicon controlled rectifier extinguishing switch 74 and, therefore, quickly extinguishes this device.

The charging switch signal is applied across the control cathode electrodes of silicon controlled rectifier charging switch 93 and triggers this device to conduction. Conducting silicon controlled rectifier charging switch 93 establishes a charging circuit for capacitor 63 through inductor 83 across battery 40 which places a charge upon capacitor 63 which is of a magnitude substantially 1.8 times that of the supply potential and of a negative polarity upon the plate connected to junction 77.

A commutating switch signal next appears in channel 4 and, substantially simultaneously, an extinguishing switch signal and a charging switch signal appears in channel 2. These switch signals trigger silicon controlled rectifier commutating switch 55, silicon controlled rectifier extinguishing switch 71 and silicon controlled rectifier charging switch 94, respectively, to conduction. Conducting silicon controlled rectifier commutating switch 55 completes an energizing circuit for stator coils 8 and 6 through conducting silicon controlled rectifier commutating switches 52 and 55. Substantially simultaneously, conducting silicon controlled rectifier extinguishing switch 71 diverts the anode-cathode current of silicon controlled rectifier commutating switch 51 toward the opposite supply line, quickly extinguishing this device, and conducting silicon controlled rectifier charging switch 94 establishes a charging circuit for capacitor 64 through series inductor 84. As silicon controlled rectifier commutating switch 51 is extinguished and interrupts the energizing circuit for stator coil 7, the resulting collapsing magnetic field induces a potential across the terminal ends of coils 7 and 6. This induced potential is of a positive polarity at the terminal end of coil 7 and places a charge upon capacitor 61, through conducting silicon controlled rectifier extinguishing switch 71, which is of a positive polarity at junction 76 and is limited in magnitude by diode 111. This charge upon capacitor 61 is of a reverse polarity relationship relative to the anode-cathode electrodes of silicon controlled rectifier extinguishing switch 71 and, therefore, quickly extinguishes this device.

A commutating switch signal next appears in channel 5 and, substantially simultaneously, an extinguishing switch signal and a charging switch signal appears in channel 3. These switch signals trigger silicon controlled rectifier commutating switch 50, silicon controlled rectifier extinguishing switch 72 and silicon controlled rectifier charging switch 91, respectively, to conduction. Conducting silicon controlled rectifier commutating switch 50 completes an energizing circuit for stator coils 7 and 6 through conducting silicon controlled rectifier commutating switches 50 and 55. Substantially simultaneously, conducting silicon controlled rectifier extinguishing switch 72 diverts the anode-cathode current of silicon controlled rectifier commutating switch 52 toward the opposite supply line, quickly extinguishing this device, and conducting silicon controlled rectifier charging switch 91 establishes a charging circuit for capacitor 61 through series inductor 81. As silicon controlled rectifier commutating switch 52 is extinguished and interrupts the energizing circuit for stator coil 8, the resulting collapsing magnetic field induces a potential across the terminal ends of coils 7 and 8. This induced potential is of a negative polarity at the terminal end of coil 8 and places a charge upon capacitor 62, through conducting silicon controlled rectifier extinguishing switch 72, which is of a negative polarity at junction 57 and is limited in magnitude by diode 112. This charge upon capacitor 62 is of a reverse polarity relationship relative to the anode-cathode electrodes of silicon controlled rectifier extinguishing switch 72 and, therefore, quickly extinguishes this device.

A commutating switch signal next appears in channel 6 and, substantially simultaneously, an extinguishing switch signal and a charging switch signal appears in channel 4. These switch signals trigger silicon controlled rectifier commutating switch 53, silicon controlled rectifier extinguishing switch 75 and silicon controlled rectifier charging switch 92, respectively, to conduction. Conducting silicon controlled rectifier commutating switch 53 completes an energizing circuit for stator coils 7 and 8 through conducting silicon controlled rectifier commutating switches 50 and 53. Substantially simultaneously, conducting silicon controlled rectifier extinguishing switch 75 diverts the anode-cathode current of silicon controlled rectifier commutating switch 55 toward the opposite supply line, quickly extinguishing this device, and conducting silicon controlled rectifier charging switch 92 establishes a charging circuit for capacitor 62 through series inductor 82. As silicon controlled rectifier commutating switch 55 is extinguished and interrupts the energizing circuit for stator coil 6, the resulting collapsing magnetic field induces a potential across the terminal ends of coils 6 and 8. This induced potential is of a positive polarity at the terminal end of coil 6 and places a charge upon capacitor 65, through conducting silicon controlled rectifier extinguishing switch 75, which is of a positive polarity at junction 78 and is limited in magnitude by diode 115. This charge upon capacitor 65 is of a reverse polarity relationship relative to the anode-cathode electrodes of silicon controlled rectifier extinguishing switch 75 and, therefore, quickly extinguishes this device.

A commutating switch signal next appears in channel 1 and, substantially simultaneously, an extinguishing switch signal and a charging switch signal appears in channel 5. These switch signals trigger silicon controlled rectifier commutating switch 54, silicon controlled rectifier extinguishing switch 70 and silicon controlled rectifier charging switch 95, respectively, to conduction. Conducting silicon controlled rectifier commutating switch 54 completes an energizing circuit for stator coils 6 and 8 through conducting silicon controlled rectifier commutating switchs 54 and 53. Substantially simultaneously, conducting silicon controlled rectifier extinguishing switch 70 diverts the anode-cathode current of silicon controlled rectifier commutating switch 50 toward the opposite supply line, quickly extinguishing this device, and conducting silicon controlled rectifier charging switch 95 establishes a charging circuit for capacitor 65 through series inductor 85. As silicon controlled rectifier commutating switch 50 is extinguished and interrupts the energizing circuit for stator coil 7, the resulting collapsing magnetic field induces a potential across the terminal ends of coils 6 and 7. This induced potential is of a negative polarity at the terminal end of coil 7 and places a charge upon capacitor 60, through conducting silicon controlled rectifier extinguishing switch 70, which is of a negative polarity at junction 56 and is limited in magnitude by diode 110. This charge upon capacitor 60 is of a reverse polarity relationship relative to the anode-cathode electrodes of silicon controlled rectifier extinguishing switch 70 and, therefore, quickly extinguishes this device.

A commutating switch signal next appears in channel 2 and, substantially simultaneously, an extinguishing switch signal and a charging switch signal appears in channel 6. These switch signals trigger silicon controlled rectifier commutating switch 51, silicon controlled rectifier extinguishing switch 73 and silicon controlled rectifier charging switch 90, respectively, to conduction. Conducting silicon controlled rectifier commutating switch 51 completes an energizing circuit for stator coils 6 and 7 through conducting silicon controlled rectifier commutating switches 54 and 51. Substantially simultaneously, conducting silicon controlled rectifier extinguishing switch 73 diverts the anode-cathode current of silicon controlled rectifier commutating switch 53 toward the opposite supply line, quickly extinguishing this device, and conducting silicon controlled rectifier charging switch 90 establishes a charging circuit for capacitor 60 through series inductor 80. As silicon controlled rectifier commutating switch 53 is extinguished and interrupts the energizing circuit for stator coil 8, the resulting collapsing magnetic field induces a potential across the terminal ends of coils 8 and 7. This induced potential is of a positive polarity at the terminal end of coil 8 and places a charge upon capacitor 63, through conducting silicon controlled rectifier extinguishing switch 73, which is of a positive polarity at junction 77 and is limited in magnitude by diode 113. This charge upon capacitor 63 is of a reverse polarity relationship relative to the anode-cathode electrodes of silicon controlled rectifier extinguishing switch 73 and, therefore, quickly extinguishes this device.

This switching action may be traced through the same sequence as successive switching signals appear in channels 1–6. From this description, it is apparent that the commutating switching system of this invention energizes the motor with an essentially rotating magnetic field, the unique extinguishing circuitry in combination therewith extinguishes each commutating switch at the proper time.

One advantage realized with the unique extinguishing circuitry hereinabove described wherein the current through the commutating switch to be extinguished is diverted toward the opposite polarity supply line is the elimination of high potentials in a reverse polarity relationship across the commutating silicon controlled rectifiers as is the case with the more common extinguishing systems.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. A direct current commutation system for brushless type electrical motors comprising, positive and negative polarity input supply lines, a bridge type commutating switching circuit having a positive and a negative polarity bank of silicon controlled rectifier commutating switching devices connected across said input supply lines, a plurality of electrical charge storage devices each corresponding to one of said commutating switching devices for storing an electrical charge, first means for charging those said electrical charge storage devices corresponding to the said commutating switching devices included in said positive polarity bank, second means for charging those said electrical charge storage devices corresponding to the said commutating switching devices included in said negative polarity bank and means for selectively diverting the current flowing through each of said commutating switch devices through the corresponding said electrical charge storage device toward the opposite said supply line.

2. A direct current commutating system for brushless type electrical motors comprising, positive and negative polarity input supply lines, a bridge type commutating switching circuit having a positive and a negative polarity bank of silicon controlled rectifier commutating switching devices connected across said input supply lines, a plurality of electrical charge storage devices each corresponding to one of said commutating switching devices for storing an electrical charge, first means for charging those said electrical charge storage devices corresponding to the said commutating switching devices included in said positive polarity bank, second means for charging those said electrical charge storage devices corresponding to the said commutating switching devices included in said negative polarity bank, a controllable extinguishing switching device having at least two current carrying electrodes and a control electrode and being of the type which may be triggered to conduction upon the application of a proper polarity signal potential to the control electrode thereof corresponding to each of said commutating switching devices and means for interconnecting each of said commutating switching devices, the corresponding said electrical charge storage device and the corresponding said controllable extinguishing switching device in such a manner that the current flowing through each of said commutating switching devices may be diverted toward the opposite supply line when the corresponding said extinguishing switching device is triggered to conduction.

3. A direct current commutation system for brushless type electrical motors comprising, positive and negative polarity input supply lines, a bridge type commutating switching circuit having a positive and a negative polarity bank of silicon controlled rectifier commutating switching devices connected across said input supply lines, a plurality of electrical charge storage devices each corresponding to one of said commutating switching devices for storing an electrical charge, first and second auxiliary charging direct current potential sources, first charging circuit means for connecting those said electrical charge storage devices corresponding to the said commutating switching devices included in said positive polarity bank in parallel across one of said auxiliary charging direct current potential sources, second charging circuit means for connecting those said electrical charge storage devices corresponding to the said commutating switching devices included in said negative polarity bank in parallel across the other one of said auxiliary charging direct current potential sources, a controllable charging switching device having at least two current carrying electrodes corresponding to each of said electrical charge storage devices, means for connecting the said current carrying electrodes of each of said controllable charging switching devices in series with the corresponding electrical charge storage device, a controllable extinguishing switching device having at least two current carrying electrodes and a control electrode and being of the type which may be triggered to conduction upon the application of a proper polarity signal potential to the control electrode thereof corresponding to each of said commutating switching devices and means for interconnecting each of said commutating switching devices, the corresponding said electrical charge storage device and the corresponding said controllable extinguishing switching device in such a manner that the current flowing through each of said commutating switching devices may be diverted toward the opposite supply line when the corresponding said extinguishing switching device is triggered to conduction.

4. A direct current commutation system for brushless type electrical motors comprising, positive and negative polarity input supply lines, a bridge type commutating switching circuit having a positive and a negative polarity bank of silicon controlled rectifier commutating switching devices each having anode, cathode and gate electrodes connected across said input supply lines, a plurality of capacitors each corresponding to one of said commutating switching devices, first means for charging those said electrical charge storage devices corresponding to the said commutating switching devices included in said positive polarity bank, second means for charging those said electrical charge storage devices corresponding to the said commutating switching devices included in said negative polarity bank, a controllable extinguishing switching device having at least anode and cathode electrodes and a control electrode and being of the type which may be triggered to conduction upon the application of a proper polarity signal potential to the control electrode thereof corresponding to each of said commutating switching devices, means for connecting one plate of each of said capacitors corresponding to those said commutating switching devices included in said positive polarity bank to said negative polarity input supply line, means for connecting the said anode-cathode electrodes of each of said controllable extinguishing switching devices corresponding to those said commutating switching devices included in said positive polarity bank in series between the said cathode electrode of the said commutating switching device to which it corresponds and the other plate of the corresponding said capacitor and forward poled, means for connecting one plate of each of said capacitors corresponding to those said commutating switching devices included in said negative polarity bank to said positive polarity input supply line and means for connecting the said anode-cathode electrodes of each of said controllable extinguishing switching devices corresponding to those said commutating switching devices included in said negative polarity bank in series between the said anode electrode of the said switching device to which it corresponds and the other plate of the corresponding said capacitor and forward poled.

5. A direct current commutation system for brushless type electrical motors comprising, positive and negative polarity input supply lines, a bridge type commutating switching circuit having a positive and a negative polarity bank of silicon controlled rectifier commutating switching devices each having anode, cathode and gate electrodes connected across said input supply lines, a plurality of electrical charge storage devices each corresponding to one of said commutating switching devices for storing an electrical charge, first and second auxiliary charging direct current potential sources, first charging circuit means for connecting those said electrical charge storage devices corresponding to the said commutating switching devices included in said positive polarity bank in parallel across one of said auxiliary charging direct current potential sources, second charging circuit means for connecting those said electrical charge storage devices corresponding to the said commutating switching devices included in said negative polarity bank in parallel across the other one of said auxiliary charging direct current potential sources, a controllable charging switching device having at least two current carrying electrodes corresponding to each of said electrical charge storage devices, means for connecting the said current carrying electrodes of each of said controllable charging switching devices in series with the corresponding electrical charge storage device, a controllable extinguishing switching device having at least two current carrying electrodes and a control electrode and being of the type which may be triggered to conduction upon the application of a proper polarity signal potential to the control electrode thereof corresponding to each of said commutating switching devices, means for connecting one plate of each of said capacitors corresponding to those said commutating switching devices included in said positive polarity bank to said negative polarity input supply line, means for connecting the said anode-cathode electrodes of each of said controllable extinguishing switching devices corresponding to those said commutating switching devices included in said positive polarity bank in series between the said cathode electrode of the said commutating switching device to which it corresponds and the other plate of the corresponding said capacitor and forward poled, means for connecting one plate of each of said capacitors corresponding to those said commutating switching devices included in said negative polarity bank to said positive polarity input supply line and means for connecting the said anode-cathode electrodes of each of said controllable extinguishing switching devices corresponding to those said commutating switching devices included in said negative polarity bank in series between the said anode electrode of the said commutating switching device to which it corresponds and the other plate of the corresponding said capacitor and forward poled.

References Cited

UNITED STATES PATENTS

| | | | |
|---|---|---|---|
| 3,207,974 | 9/1965 | McMurray | 321—45 |
| 3,263,152 | 7/1966 | Walker | 321—45 |
| 3,354,370 | 11/1967 | Corry et al. | 318—227 |
| 3,355,654 | 11/1967 | Risberg | 321—45 XR |

LEE T. HIX, *Primary Examiner.*

W. M. SHOOP, *Assistant Examiner.*